(12) United States Patent
Jawahar et al.

(10) Patent No.: US 12,154,548 B2
(45) Date of Patent: Nov. 26, 2024

(54) SYSTEM AND METHOD FOR LIP-SYNCING A FACE TO TARGET SPEECH USING A MACHINE LEARNING MODEL

(71) Applicant: INTERNATIONAL INSTITUTE OF INFORMATION TECHNOLOGY, HYDERABAD, Hyderabad (IN)

(72) Inventors: C. V. Jawahar, Hyderabad (IN); Rudrabha Mukhopadhyay, Hyderabad (IN); K R Prajwal, Hyderabad (IN); Vinay Namboodiri, Bath (GB)

(73) Assignee: INTERNATIONAL INSTITUTE OF INFORMATION TECHNOLOGY, HYDERABAD, Hyderabad (IN)

( * ) Notice: Subject to any disclaimer, the term of this patent is extended or adjusted under 35 U.S.C. 154(b) by 393 days.

(21) Appl. No.: 17/567,120

(22) Filed: Jan. 1, 2022

(65) Prior Publication Data
US 2022/0215830 A1 Jul. 7, 2022

(30) Foreign Application Priority Data
Jan. 2, 2021 (IN) .............................. 202141000085

(51) Int. Cl.
*G10L 15/25* (2013.01)
*G10L 15/02* (2006.01)
*G10L 15/06* (2013.01)

(52) U.S. Cl.
CPC ............ *G10L 15/063* (2013.01); *G10L 15/02* (2013.01); *G10L 15/25* (2013.01); *G10L 2015/0635* (2013.01)

(58) Field of Classification Search
CPC ....... G10L 15/063; G10L 15/02; G10L 15/25; G10L 2015/0635
(Continued)

(56) References Cited

U.S. PATENT DOCUMENTS

| 6,766,299 B1* | 7/2004 | Bellomo ................. G10L 21/10 704/E21.02 |
| 2023/0023102 A1* | 1/2023 | Song ...................... G06N 3/045 |

FOREIGN PATENT DOCUMENTS

KR    20100012525 A  *  2/2010   ............... G06F 3/16

OTHER PUBLICATIONS

A Lip Sync Expert is All You Need for Speech to Lip Generation in The Wild; Publication Date: Aug. 23, 2020 How we process NPL dates Authors: Prajwal, K R • Mukhopadhyay, Rudrabha • Namboodiri, Vinay • Jawahar, C V (Year: 2020).*
(Continued)

*Primary Examiner* — Bharatkumar S Shah (57) ABSTRACT

A processor-implemented method for generating a lip-sync for a face to a target speech of a live session to a speech in one or more languages in-sync with improved visual quality using a machine learning model and a pre-trained lip-sync model is provided. The method includes (i) determining a visual representation of the face and an audio representation, the visual representation includes crops of the face; (ii) modifying the crops of the face to obtain masked crops; (iii) obtaining a reference frame from the visual representation at a second timestamp; (iv) combining the masked crops at the first timestamp with the reference to obtain lower half crops; (v) training the machine learning model by providing historical lower half crops and historical audio representations as training data; (vi) generating lip-synced frames for the face to the target speech, and (vii) generating an in-sync lip-synced frames by the pre-trained lip-sync model.

15 Claims, 9 Drawing Sheets

(58) Field of Classification Search
USPC .......................................................... 704/276
See application file for complete search history.

(56) References Cited

OTHER PUBLICATIONS

A Lip Sync Expert is All You Need for Speech to Lip Generation in The Wild; Publication Date: Aug. 23, 2020 How we process NPL dates Authors: Prajwal, K R Mukhopadhyay, Rudrabha Namboodiri, Vinay Jawahar, C V (Year: 2020) (Year: 2020).*

Y. Shalev and L. Wolf, "End to End Lip Synchronization with a Temporal AutoEncoder," 2020 IEEE Winter Conference on Applications of Computer Vision (WACV), Snowmass, CO, USA, 2020, pp. 330-339, doi: 10.1109/WACV45572.2020.9093490. keywords: {Visualization;Streaming media;Decoding;Lips;Face;Tensile st (Year: 2020).*

* cited by examiner

SYSTEM AND METHOD FOR LIP-SYNCING A FACE TO TARGET SPEECH USING A MACHINE LEARNING MODEL

CROSS-REFERENCE TO PRIOR-FILED PATENT APPLICATIONS

This application claims priority from the Indian provisional application no. 202141000085 filed on Jan. 2, 2021, which is herein incorporated by reference.

TECHNICAL FIELD

The embodiments herein generally relate to generating a lip-sync for a face to a target speech of a live session to a speech in one or more languages in-sync with improved visual quality using a machine learning model and a pre-trained lip-sync model.

DESCRIPTION OF THE RELATED ART

In this modern era, the consumption of audio-visual content rises exponentially and thereby rapid video content creation becomes a classic need. Also, creating videos accessible in different languages is a typical task. For example, a famous movie, a learning lecture series, or a public address to a nation, if translated to the desired target language becomes accessible to millions of new viewers. The aspect of translating such talking face videos or creating new ones with corrected lip sync to match the desired target speech.

Existing systems map speech representations to lip landmarks using several hours of a single speaker. The existing systems generate images from speech representations and generate good quality for specific speakers that they have been trained upon. To work for generic identities and speech inputs, the existing systems are not trained well. The existing systems fail to generate accurate lip motion on dynamic, unconstrained videos not just on static images.

Existing systems convert audio phonemically to lip-sync videos. Also, the existing systems animate lips from given textual inputs. The animation is generated using a look-up table. A viseme is a generic facial image that describes a particular sound. The look-up table includes different visemes that are created from three-dimensional scans of actors, actresses, or sculpted by a digital artist. The existing systems get limited where the look-up table does not contain the desired viseme for a person. The existing systems often fail to maintain temporal consistency in generated lip movements. Some of the existing systems animate lip movements from an input that describes songs and handles lyric text. The existing systems determine the deformation curve from the genre of the song which constrains the type of input that is handled.

Therefore, there arises a need to address the aforementioned technical drawbacks in existing technologies to generate lip-synced input files.

SUMMARY

In a view of the foregoing, an embodiment herein provides a processor-implemented method for generating a lip-sync for at least one face to a target speech of a live session to a speech in one or more languages in-sync with improved visual quality using a machine learning model and a pre-trained lip-sync model. The method includes determining a visual representation of the at least one face and an audio representation of the target speech by pre-processing an input file that is obtained from a user device associated with a user. In some embodiments, the visual representation of the at least one face includes one or more crops of the at least one face in at least one frame of the input file at a first timestamp and the audio representation of the target speech includes a spectrum of frequencies of sound at the first timestamp. The method includes modifying the one or more crops of the at least one face to obtain one or more masked crops of the at least one face, the masked crops of the at least one face appears black at lower half portions of the one or more crops of the at least one face using a masking technique. The method includes obtaining a reference frame in the visual representation at a second timestamp. In some embodiments, the reference frame includes the one or more crops of the at least one face at the second timestamp. The method includes combining the one or more masked crops of the at least one face at the first timestamp with the reference frame at the second timestamp to obtain one or more lower half crops of the at least one face at the first timestamp using a concatenating technique. The method includes training the machine learning model by providing one or more historical lower half crops associated with one or more faces at the first timestamp and one or more historical audio representations at the first timestamp as training data to generate a trained machine learning model at the first timestamp. The method includes generating lip-synced frames at the first timestamp for the at least one face to the target speech of the live session to the speech in the one or more languages using the trained machine learning model. The method includes generating in-sync lip-synced frames by providing the lip-synced frames at the first timestamp for the at least one face to the target speech of the live session to the speech in the one or more languages with improved visual quality by the pre-trained lip-sync model.

In some embodiments, the optimized lip-synced frames of the target speech are generated using the machine learning model by, (i) providing the lip-synced frames to a first discriminator for the at least one face to the target speech and ground truth frames of the lip-synced frames for the at least one face to the target speech, the lip-synced frames for the at least one face to the target speech are generated by a first generator; (ii) generating, using the first discriminator, a loss function when there is no difference between the lip-synced frames for the at least one face to the target speech and the ground truth frames of the lip-synced frames for the at least one face to the target speech; (iii) backpropagating the loss function to the first generator to optimize the lip-synced frames of the target speech such that the loss function becomes zero; and (iv) generating the optimized lip-synced frames of the target speech as training data to obtain the trained machine learning model.

In some embodiments, the pre-trained lip-sync model is trained by, (i) providing the lip-synced frames to a second generator for the at least one face to the target speech to obtain an in-sync lip-synced frames for the at least one face to the target speech, an out-sync lip-synced frames for the at least one face to the target speech are generated if the lip-synced frames for the at least one face to the target speech are not in-sync; (ii) providing the in-sync lip-synced frames to a second discriminator for the at least one face to the target speech and a ground truth in-sync lip-synced frames for the at least one face to the target speech; (iii) generating a synchronization loss function when there is no difference between the in-sync lip-synced frames for the at least one face to the target speech and a ground truth in-sync lip-synced frames for the at least one face to the target speech using the second discriminator; (iv) backpropagating the synchronization loss function to the second generator to optimize the in-sync lip-synced frames for the at least one face to the target speech such that the synchronization loss function becomes zero; and (iv) training the pre-trained lip-sync model by providing an optimized in-sync lip-synced frames for the at least one face to the target speech as training data to the pre-trained lip-sync model.

In some embodiments, the input file is pre-processed by, (i) generating, using a face detector, the one or more crops of the at least one face that is visible on each frame of the input file from the input file to determine the visual representation of the at least one targeted face, the input file includes at least one face appearance and an audio of a human voice; and (ii) converting the audio of the human voice in the input file the spectrum of frequencies of sound that varies with time or one or more features offset to the human voice to determine the audio representation of the target speech.

In some embodiments, the first generator includes an audio encoder, a visual encoder, a concatenator, or a decoder.

In some embodiments, further includes correcting a lip-sync error in a broadcast video by locating corresponding face to the target speech.

In some embodiments, the one or more lower half crops of the at least one face is stored in a database.

In one aspect, one or more non-transitory computer-readable storage medium store the one or more sequence of instructions, which when executed by a processor, further causes a method for generating a lip-sync for at least one face to a target speech of a live session to a speech in one or more languages in-sync with improved visual quality using a machine learning model and a pre-trained lip-sync model. The method includes determining a visual representation of the at least one face and an audio representation of the target speech by pre-processing an input file that is obtained from a user device associated with a user. In some embodiments, the visual representation of the at least one face includes one or more crops of the at least one face in at least one frame of the input file at a first timestamp and the audio representation of the target speech includes a spectrum of frequencies of sound at the first timestamp. The method includes modifying the one or more crops of the at least one face to obtain one or more masked crops of the at least one face, the masked crops of the at least one face appears black at lower half portions of the one or more crops of the at least one face using a masking technique. The method includes obtaining a reference frame in the visual representation at a second timestamp. In some embodiments, the reference frame includes the one or more crops of the at least one face at the second timestamp. The method includes combining the one or more masked crops of the at least one face at the first timestamp with the reference frame at the second timestamp to obtain one or more lower half crops of the at least one face at the first timestamp using a concatenating technique. The method includes training the machine learning model by providing one or more historical lower half crops associated with one or more faces at the first timestamp and one or more historical audio representations at the first timestamp as training data to generate a trained machine learning model at the first timestamp. The method includes generating lip-synced frames at the first timestamp for the at least one face to the target speech of the live session to the speech in the one or more languages using the trained machine learning model. The method includes generating in-sync lip-synced frames by providing the lip-synced frames at the first timestamp for the at least one face to the target speech of the live session to the speech in the one or more languages with improved visual quality by the pre-trained lip-sync model.

In another aspect, a system for generating a lip-sync for at least one face to a target speech of a live session to a speech in one or more languages in-sync with improved visual quality using a machine learning model and a pre-trained lip-sync model. The system includes a memory that stores a database and a set of instructions and a processor in communication with the memory, the processor retrieving executing machine-readable program instructions from the memory which, when executed by the processor, enable the processor to (i) determine a visual representation of the at least one face and an audio representation of the target speech by pre-processing an input file that is obtained from a user device associated with a user, the visual representation of the at least one face includes one or more crops of the at least one face in at least one frame of the input file at a first timestamp and the audio representation of the target speech includes a spectrum of frequencies of sound at the first timestamp; (ii) modify the one or more crops of the at least one face to obtain one or more masked crops of the at least one face, the masked crops of the at least one face appears black at lower half portions of the one or more crops of the at least one face using a masking technique; (iii) obtain a reference frame in the visual representation at a second timestamp, the reference frame includes the one or more crops of the at least one face at the second timestamp; (iv) combine the one or more masked crops of the at least one face at the first timestamp with the reference frame at the second timestamp to obtain one or more lower half crops of the at least one face at the first timestamp using a concatenating technique; (v) train the machine learning model by providing one or more historical lower half crops associated with one or more faces at the first timestamp and one or more historical audio representations at the first timestamp as training data to generate a trained machine learning model at the first timestamp; (vi) generate lip-synced frames at the first timestamp for the at least one face to the target speech of the live session to the speech in the one or more languages using the trained machine learning model; and (vii) generate in-sync lip-synced frames by providing the lip-synced frames at the first timestamp for the at least one face to the target speech of the live session to the speech in the one or more languages with improved visual quality by the pre-trained lip-sync model.

In some embodiments, the optimized lip-synced frames of the target speech are generated using the machine learning model by, (i) providing the lip-synced frames to a first discriminator for the at least one face to the target speech and ground truth frames of the lip-synced frames for the at least one face to the target speech, the lip-synced frames for the at least one face to the target speech are generated by a first generator; (ii) generating, using the first discriminator, a loss function when there is no difference between the lip-synced frames for the at least one face to the target speech and the ground truth frames of the lip-synced frames for the at least one face to the target speech; (iii) backpropagating the loss function to the first generator to optimize the lip-synced frames of the target speech such that the loss function becomes zero; and (iv) generating the optimized lip-synced frames of the target speech as training data to obtain the trained machine learning model.

In some embodiments, the pre-trained lip-sync model is trained by, (i) providing the lip-synced frames to a second generator for the at least one face to the target speech to obtain an in-sync lip-synced frames for the at least one face to the target speech, an out-sync lip-synced frames for the at least one face to the target speech are generated if the lip-synced frames for the at least one face to the target speech are not in-sync; (ii) providing the in-sync lip-synced frames to a second discriminator for the at least one face to the target speech and ground truth in-sync lip-synced frames for the at least one face to the target speech; (iii) generating a synchronization loss function when there is no difference between the in-sync lip-synced frames for the at least one face to the target speech and a ground truth in-sync lip-synced frames for the at least one face to the target speech using the second discriminator; (iv) backpropagating the synchronization loss function to the second generator to optimize the in-sync lip-synced frames for the at least one face to the target speech such that the synchronization loss function becomes zero; and (iv) training the pre-trained lip-sync model by providing an optimized in-sync lip-synced frames for the at least one face to the target speech as training data to the pre-trained lip-sync model.

In some embodiments, the input file is pre-processed by, (i) generating, using a face detector, the one or more crops of the at least one face that is visible on each frame of the input file from the input file to determine the visual representation of the at least one targeted face, the input file includes at least one face appearance and an audio of a human voice; and (ii) convening the audio of the human voice in the input file the spectrum of frequencies of sound that varies with time or one or more features offset to the human voice to determine the audio representation of file target speech.

In some embodiments, the first generator includes an audio encoder, a visual encoder, a concatenator, or a decoder.

In some embodiments, further includes correcting a lip-sync error in a broadcast video by locating corresponding face to the target speech.

In some embodiments, the one or more lower half crops of the at least one face is stored in a database.

The system and method for generating a lip-sync of a user in an input file to a target speech are provided. The system enables a wide range of applications in the entertainment industry. The system allows lip-syncing in the dubbing phase for movies, television shows, web-series, etc. The lip-syncing brings to release any movie, or television show, or web-series in multi-languages at a time. The system reduces costs and the time for dubbing in multi-languages at a time. Also, the lip-syncing in real animated videos and games are improvised through this system. The system enables video-conferencing in low-bandwidth conditions. The system enhances content creation in social media. The system enables lip-syncing the lips of the original speaker in press conferences, documentaries, or any live sessions like games to a speech in desired languages.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE DRAWINGS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there is a need for a system and method for generating a lip-sync for a face to a target speech of a live session to a speech in one or more languages in-sync with improved visual quality using a machine learning model and a pre-trained lip-sync model. Referring now to the drawings, and more particularly to FIG. 1 through FIG. 8, where similar reference characters denote corresponding features consistently throughout the figures, preferred embodiments are shown.

Figure 1:
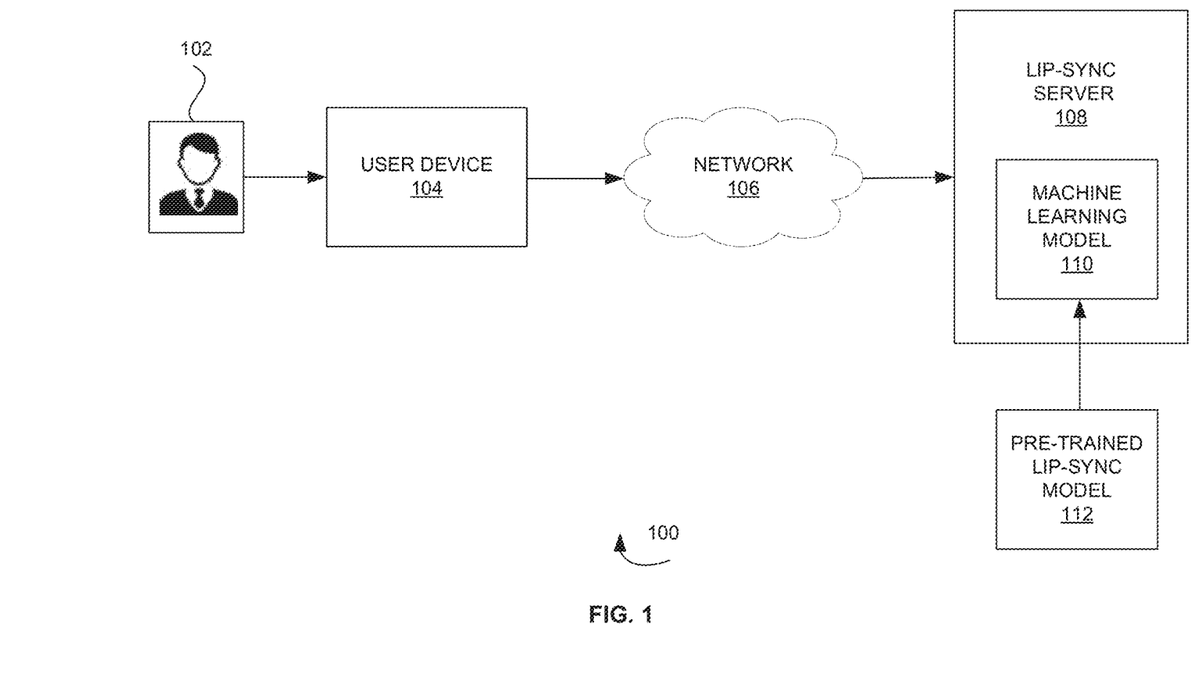
FIG. 1 illustrates a system for generating a lip-sync for at least one face to a target speech of a live session to a speech in one or more languages in-sync with improved visual quality using a machine learning model and a pre-trained lip-sync model, according to some embodiments herein.

FIG. 1 illustrates a system 100 for generating a lip-sync for at least one face to a target speech of a live session to a speech in one or more languages in-sync with improved visual quality using a machine learning model 110 and a pre-trained lip-sync model 112, according to some embodiments herein. The system 100 includes a user 102, a user device 104, and a lip-sync server 108. The user device 104 may be associated with the user 102. The user device 104 includes a user interface to obtain an input file from the user 102. The input file may include at least one face in the input file to a target speech. The user device 104 includes, but is not limited to, a handheld device, a mobile phone, a kindle, a Personal Digital Assistant (PDA), a tablet, a laptop, a music player, a computer, an electronic notebook, or a smartphone and the like. The lip-sync server 108 includes a device processor and a non-transitory computer-readable storage medium storing one or more sequences of instructions, which when executed by the device processor causes the generation of lip-syncing for at least one face to a target speech of a live session to a speech in one or more languages in-sync with improved visual quality. The lip-sync server 108 may obtain the input file from the user device 104 associated with the user 102 through a network 106. The network 106 includes, but is not limited to, a wireless network, a wired network, a combination of the wired network and the wireless network or Internet, and the like. The input file includes but is not limited to, videos, images, or a live session, etc. The input file may be a video that includes audio and one or more face appearances. The audio in the input file may be a human speech. The video may be, for example, a program from a drama in television or broadcast news, or from a movie, or a lecture that was dubbed or may be unrelated. In some embodiments, the lip-sync server 108 may determine a speaker in a multi-speaker video. In some embodiments, system 100 may include an application that may be installed in android-based devices, windows-based devices, or any such mobile operating systems devices for generating lip-sync for the at least one face to the target speech of the live session to the speech in one or more languages in-sync with the improved visual quality. The target speech may be in any language and in any voice.

The lip-sync server 108 determines a visual representation of the at least one face and an audio representation of the target speech. The lip-sync server 108 pre-processes the input file to obtain the visual representation and the audio representation. The visual representation of the at least one face includes one or more crops of the at least one face in at least one frame of the input file at a first timestamp. The one or more crops of the at least one face are stored in a database.

The audio representation of the target speech includes a spectrum of frequencies of sound at the first timestamp. The audio representation may be a visual representation of the spectrum of frequencies of sound that varies with time. The audio representation may be mel-spectrogram. In some embodiments, the mel-spectrogram include one or more features attenuated to the human voice.

The lip-sync server 108 modifies one or more crops of the at least one face to obtain one or more masked crops of the at least one face. The masked crops of the at least one face may appear black at lower half portions of the one or more crops of the at least one face using a masking technique. The lip-sync server 108 obtains a reference frame in the visual representation at a second timestamp. The reference frame includes the one or more crops of the at least one face at the second timestamp. The lip-sync server 108 combines the one or more masked crops of the at least one face at the first timestamp with the reference frame at the second timestamp to obtain one or more lower half crops of the at least one face at the first timestamp using a concatenating technique.

The lip-sync server 108 trains the machine learning model 110 by providing one or more historical lower half crops associated with one or more faces at the first timestamp and one or more historical audio representations at the first timestamp as training data to generate a trained machine learning model at the first timestamp. The lip-sync server 108 generates lip-synced frames at the first timestamp for the at least one face to the target speech of the live session to the speech in the one or more languages using the trained machine learning model. The lip-sync server 108 generates in-sync lip-synced frames by providing the lip-synced frames at the first timestamp for the at least one face to the target speech of the live session to the speech in the one or more languages with improved visual quality by the pre-trained lip-sync model 112.

In some embodiments, the lip-sync server 108 corrects a lip-sync error in a broadcast video, for locating the corresponding mouth image for an audio sample precisely.

Figure 2:
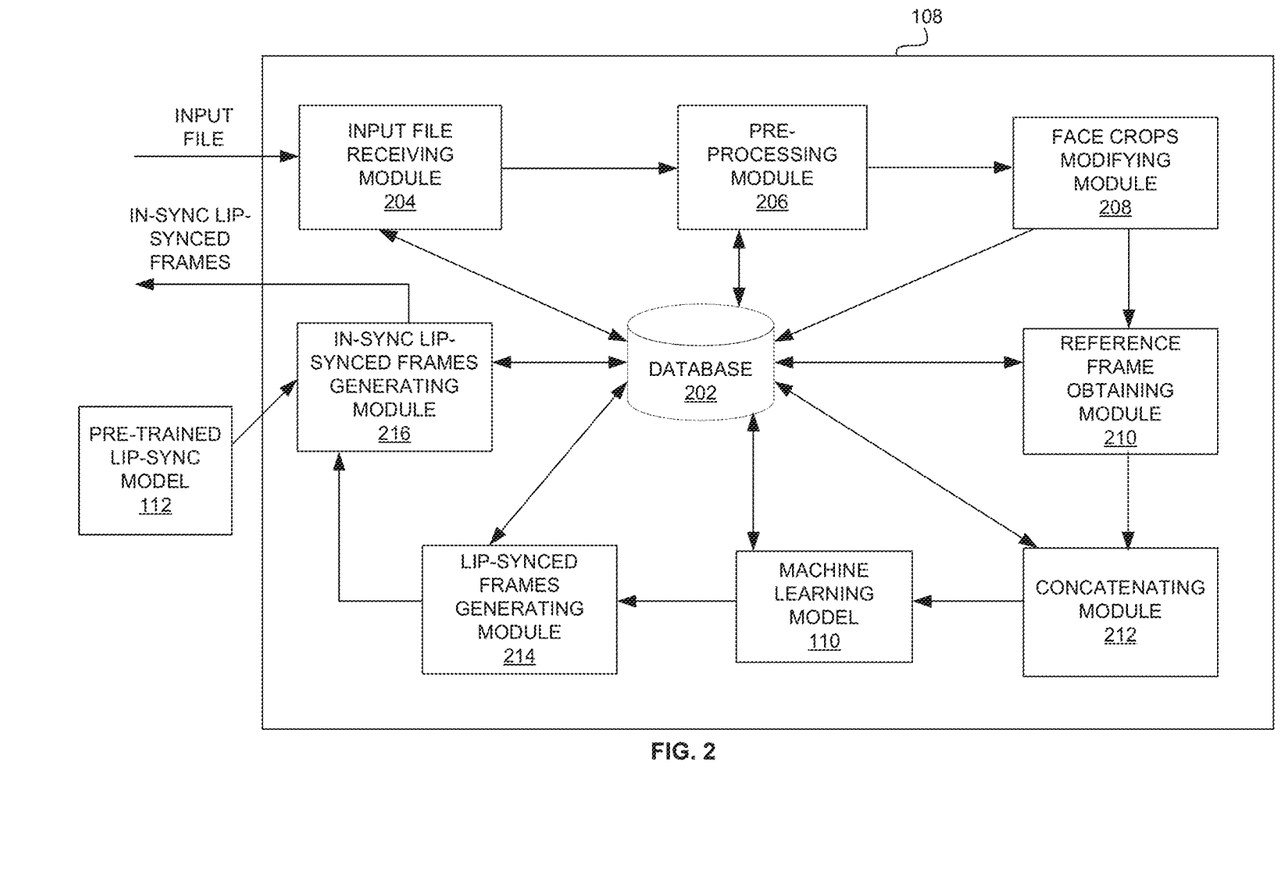
FIG. 2 is a block diagram of a lip-sync server of FIG. 1, according to some embodiments herein.

FIG. 2 is a block diagram of a lip-sync server 108 of FIG. 1, according to some embodiments herein. The lip-sync server 108 includes a database 202, an input receiving module 204, a pre-processing module 206, a face crops modifying module 208, a reference frame obtaining module 210, a concatenating module 212, a machine learning model 110, a lip-synced frames generating module 214, an in-sync lip-synced frames generating module 216, and a pre-trained lip-sync model 112.

The input receiving module 204 obtains an input file from the user device 104 associated with the user 102. The audio in the input file may be a human speech or a synthetic speech. The video may be, for example, a program from a drama in television or broadcast news, or from a movie, or a lecture that was dubbed or may be unrelated. The pre-processing module 206 pre-processes the input file to obtain the visual representation and the audio representation. The visual representation of the at least one face includes one or more crops of the at least one face in at least one frame of the input file at a first timestamp. The one or more crops of the at least one face are stored in the database 202. The audio representation of the target speech includes a spectrum of frequencies of sound at the first timestamp. The audio representation may be a visual representation of the spectrum of frequencies of sound that varies with time. The audio representation may be mel-spectrogram. In some embodiments, the mel-spectrogram include one or more features attenuated to the human voice.

The face crops modifying module 208 modifies one or more crops of the at least one face to obtain one or more masked crops of the at least one face. The masked crops of the at least one face may appear black at lower half portions of the one or more crops of the at least one face using a masking technique. In some embodiments, the one or more crops of the at least one face appearance and the one or more audio representations may be obtained from one or more convolutional layers.

The reference frame obtaining module 210 obtains a reference frame in the visual representation at a second timestamp. The reference frame includes the one or more crops of the at least one face at the second timestamp. The concatenating module 212 combines the one or more masked crops of the at least one face at the first timestamp with the reference frame at the second timestamp to obtain one or more lower half crops of the at least one face at the first timestamp using a concatenating technique.

The machine learning model 110 is trained by providing one or more historical lower half crops associated with one or more faces at the first timestamp and one or more historical audio representations at the first timestamp as training data to generate a trained machine learning model at the first timestamp. The lip-synced frames generating module 214 generates lip-synced frames at the first timestamp for the at least one face to the target speech of the live session to the speech in the one or more languages using the trained machine learning model. The in-sync lip-synced frames generating module 216 generates in-sync lip-synced frames by providing the lip-synced frames at the first timestamp for the at least one face to the target speech of the live session to the speech in the one or more languages with improved visual quality by the pre-trained lip-sync model 112.

Figure 3:
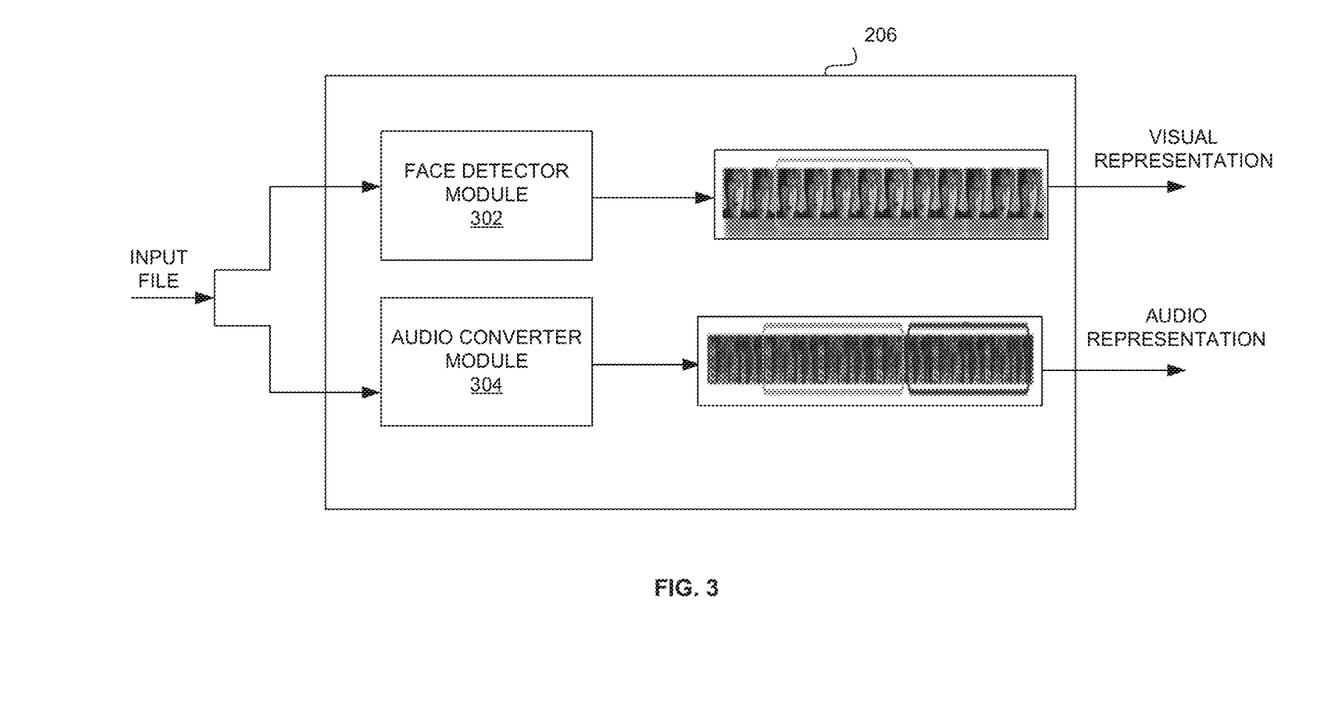
FIG. 3 is a block diagram of a pre-processing module of the lip-sync server of FIG. 2, according to some embodiments herein.

FIG. 3 illustrates a block diagram of a pre-processing module 206 of the lip-sync server 108 in FIG. 1, according to some embodiments herein. The block diagram of a pre-processing module 206 of the lip-sync server 108 includes a face detector module 302, an audio converter module 304. The face detector module 302 generates one or more crops of the at least one face that is visible on each frame of the input file from the input file to determine the visual representation of the at least one face. The input file includes at least one face appearance and an audio of a human voice. The face detector may be a state-of-the-art (SOTA) detector. The audio in the input file may be a human speech or a synthetic speech. The audio converter module 304 converts the audio of the human voice in the input file the spectrum of frequencies of sound that varies with time or one or more features offset to the human voice to determine the audio representation of the target speech. The one or more audio representations may be a visual representation of the spectrum of frequencies of sound that varies with time. The one or more audio representations may be mel-spectrograms. In some embodiments, the mel-spectrograms include one or more features attenuated to the human voice.

Figure 4:
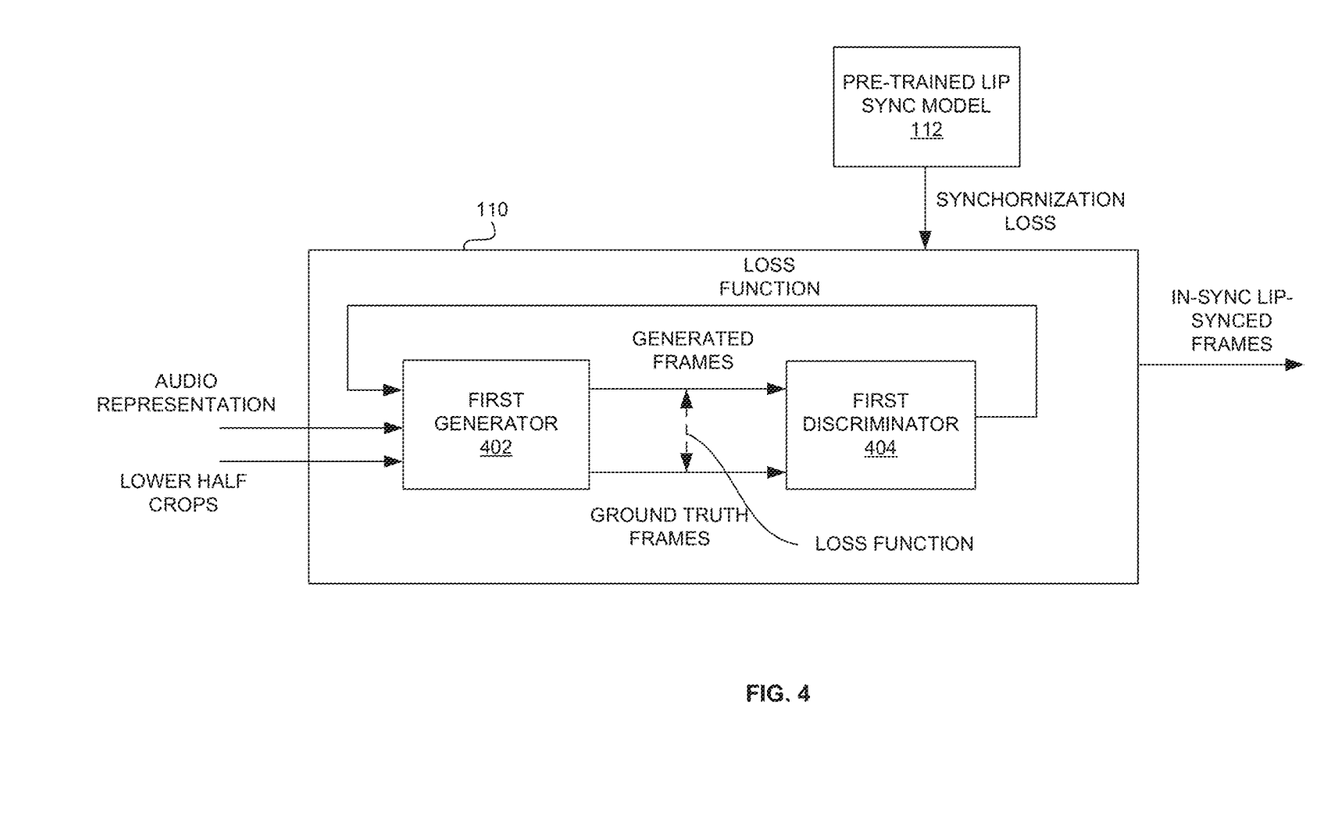
FIG. 4 is a block diagram of a machine learning model of the lip-sync server of FIG. 1 according to some embodiments herein.

FIG. 4 is a block diagram of a machine learning model 110 of the lip-sync server 108 of FIG. 1 according to some embodiments herein. The machine learning module 110 includes a first generator 402, a first discriminator 404, and a pre-trained lip-sync model 112. The first generator 402 includes an audio encoder, a visual encoder, a concatenator, and a decoder. The audio encoder receives the audio representation of the input file. The visual encoder receives the video representation of the input file. The audio encoder generates an audio embedding for the audio representation. The visual encoder receives the one or more crops of the at least one face. The visual encoder generates one or more masked crops of the at least one face at the first timestamp with the reference frame at the second timestamp to obtain one or more lower half crops of the at least one face at the first timestamp. The concatenator combines the audio embedding and the video embedding. The decoder generates lip-synced frames for the at least one face to the target speech by forwarding concatenated the audio embedding and the video embedding. The first generator 402 generates lip-synced frames for the at least one face to the target speech. The first discriminator 404 discriminates the lip-synced frames for the at least one face to the target speech and ground truth frames of the lip-synced frames for the at least one face to the target speech. The first discriminator 404 generates a loss function when there is no difference between the lip-synced frames for the at least one face to the target speech and the ground truth frames of the lip-synced frames for the at least one face to the target speech. The first discriminator 404 backpropagates the loss function to the first generator 402 to optimize the lip-synced frames of the target speech such that the loss function becomes zero. The machine learning model 110 obtains the optimized lip-synced frames of the target speech as training data to obtain the trained machine learning model. Thereby, the visual quality of the lip-synced frames of the target speech is improved.

Figure 5:
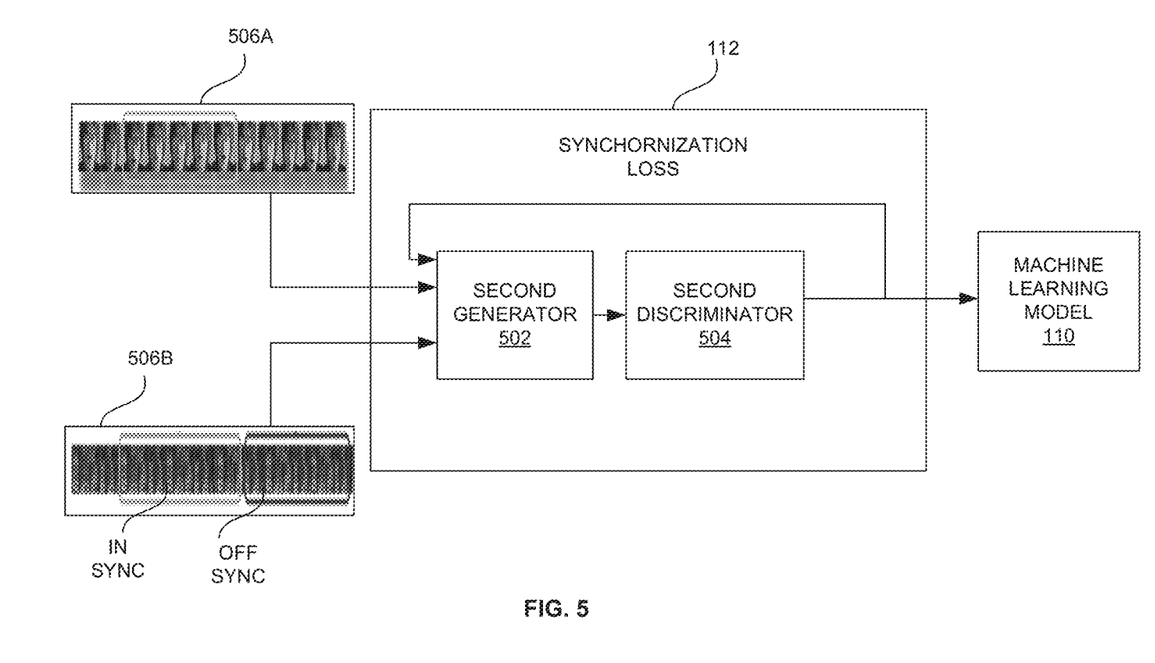
FIG. 5 is a block diagram of a pre-trained lip-sync model of FIG. 1 according to some embodiments herein.

FIG. 5 is a block diagram of a pre-trained lip-sync model 112 of FIG. 1 according to some embodiments herein. The pre-trained lip-sync model 112 includes a second generator 502, a second discriminator 504, and one or more lower half crops of the at least one face appearance 506A, and an audio representation 506B. The second generator 502 generates an in-sync lip-synced frames by obtaining the lip-synced frames from the trained machine learning model 110 for the at least one face to the target speech. The second generator 502 generates an out-sync lip-synced frames for the at least one face to the target speech if the lip-synced frames for the at least one face to the target speech are not in-sync. The in-sync frames may be positive, and the out-sync frames may be negative. In some embodiments, the pre-trained lip-sync model 112 is trained on a dataset to predict whether the lip-synced frames are a positive pair or a negative pair. The second discriminator 504 discriminates the in-sync lip-synced frames and ground truth in-sync lip-synced frames for the at least one face to the target speech. The second discriminator 504 generates a synchronization loss function when there is no difference between the in-sync lip-synced frames for the at least one face to the target speech and a ground truth in-sync lip-synced frames for the at least one face to the target speech. The second discriminator 504 backpropagates the synchronization loss function to the second generator 502 to optimize the in-sync lip-synced frames for the at least one face to the target speech such that the synchronization loss function becomes zero. The pre-trained lip-sync model 112 is trained by providing an optimized in-sync lip-synced frames for the at least one face to the target speech as training data.

Also, the pre-trained lip-sync model 112 may generate a cosine similarity loss based on the audio-video pair. In some embodiments, the cosine similarity may be a binary cross entropy loss. For the in-sync lip-synced frames which may be positive, the cosine similarity may be close to one. For the out-sync lip-synced frames which may be negative, the cosine similarity may be close to zero. The binary cross entropy loss may be backpropagated to the generator 502 when the cosine similarity may be close to zero.

Figure 6:
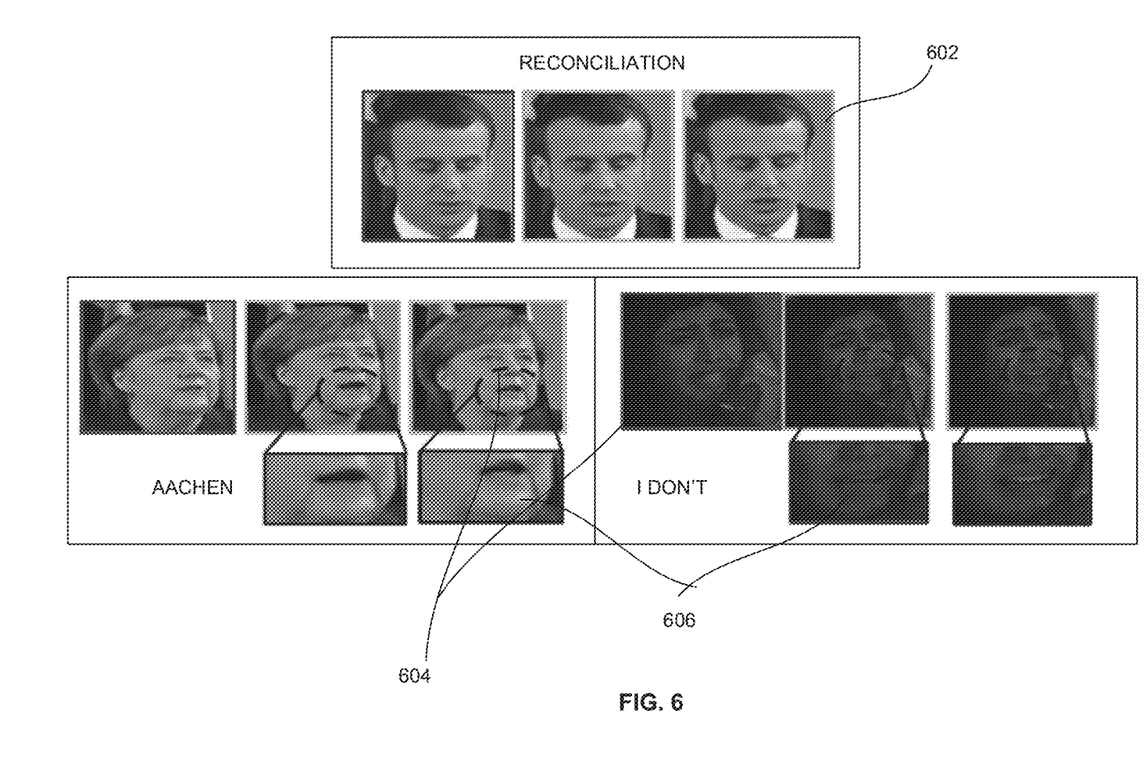
FIG. 6 illustrates an exemplary representation of a generated lip-synced version in-sync lip-synced frames of the input file, according to some embodiments herein.

FIG. 6 illustrates an exemplary representation of a generated lip-synced version of the input file using a lip-sync server 108 in FIG. 1, according to some embodiments herein. The exemplary representation includes an image of the at least one face and the desired pose information at 602, a lip-synced frames of the at least one face at 604, and one or more masked crops of the at least one face at the first timestamp at 606. The image of the at least one face 602 that is considered as reference frames are concatenated with the one or more masked crops of the at least one face at the first timestamp at 604. The concatenated frames are encoded to obtain a video embedding. An audio embedding is obtained from an audio encoder, for example, "RECONCILIATION", "AACHEN', "I DON'T" as shown in the figure. The audio embedding and the video embedding are concatenated to obtain in-sync lip-synced frames that match the given pose.

Figure 7A:
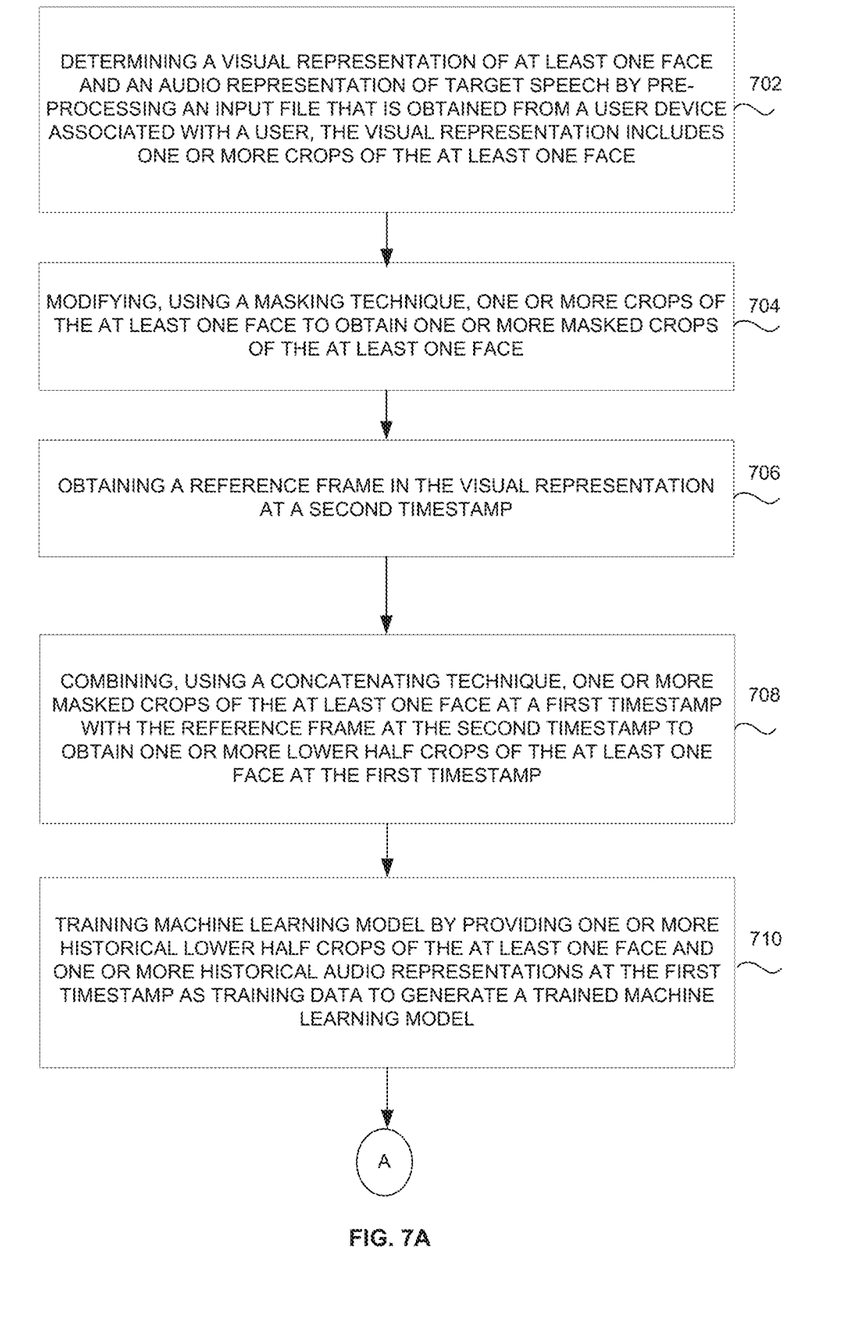
FIGS. 7A-7B are flow diagrams of a method for generating a lip-sync for at least one face to a target speech of a live session to a speech in one or more languages in-sync with improved visual quality using a machine learning model and a pre-trained lip-sync model, according to some embodiments herein.
Figure 7B:
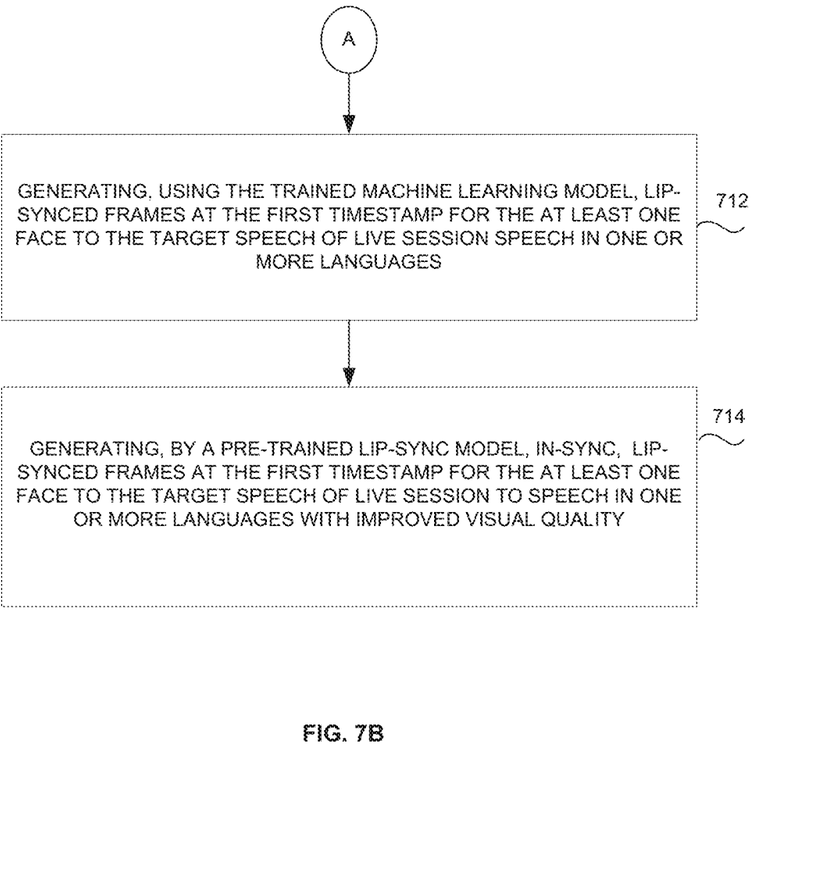

FIGS. 7A-7B are flow diagrams of a method for generating a lip-sync for at least one face to a target speech of a live session to a speech in one or more languages in-sync with improved visual quality using a machine learning model and a pre-trained lip-sync model, according to some embodiments herein. At a step 702, the method includes determining a visual representation of the at least one face and an audio representation of the target speech by pre-processing an input file that is obtained from a user device associated with a user. In some embodiments, the visual representation of the at least one face includes one or more crops of the at least one face in at least one frame of the input file at a first timestamp and the audio representation of the target speech includes a spectrum of frequencies of sound at the first timestamp. At a step 704, the method includes modifying the one or more crops of the at least one face to obtain one or more masked crops of the at least one face, the masked crops of the at least one face appears black at lower half portions of the one or more crops of the at least one face using a masking technique. At a step 706, the method includes obtaining a reference frame in the visual representation at a second timestamp. In some embodiments, the reference frame includes the one or more crops of the at least one face at the second timestamp. At a step 708, the method includes combining the one or more masked crops of the at least one face at the first timestamp with the reference frame at the second timestamp to obtain one or more lower half crops of the at least one face at the first timestamp using a concatenating technique. At a step 710, the method includes training the machine learning model by providing one or more historical lower half crops associated with one or more faces at the first timestamp and one or more historical audio representations at the first timestamp as training data to generate a trained machine learning model at the first timestamp. At a step 712, the method includes generating lip-synced frames at the first timestamp for the at least one face to the target speech of the live session to the speech in the one or more languages using the trained machine learning model. At a step 714, the method includes generating in-sync lip-synced frames by providing the lip-synced frames at the first timestamp for the at least one face to the target speech of the live session to the speech in the one or more languages with improved visual quality by the pre-trained lip-sync model.

Figure 8:
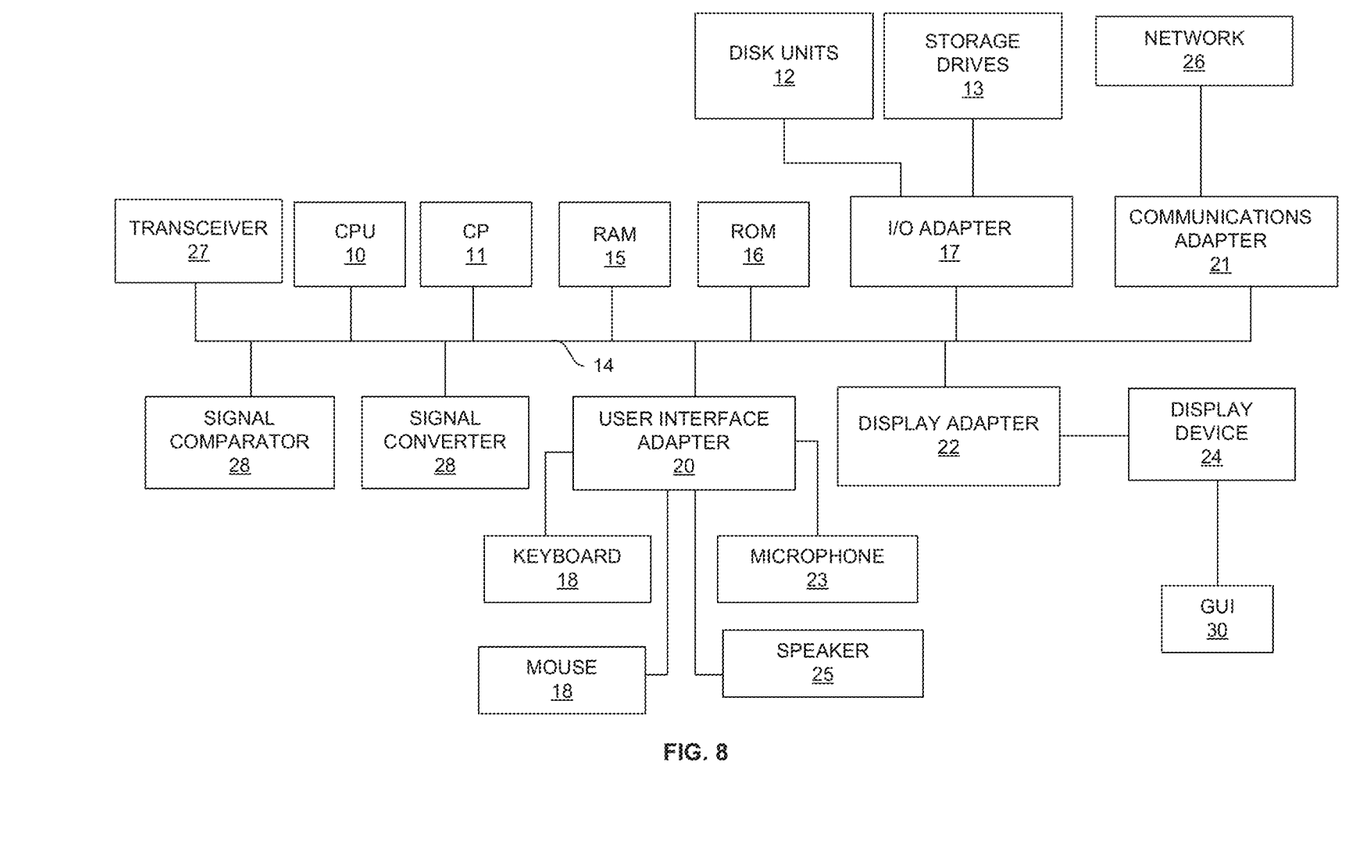
FIG. 8 is a schematic diagram of a computer architecture in accordance with the embodiments herein.

A representative hardware environment for practicing the embodiments herein is depicted in FIG. 8, with reference to FIGS. 1 through 7A-7B. This schematic drawing illustrates a hardware configuration of a lip-sync server 108/computer system/computing device in accordance with the embodiments herein. The system includes at least one processing device CPU 10 that may be interconnected via system bus 14 to various devices such as a random access memory (RAM) 12, read-only memory (ROM) 16, and an input/output (I/O) adapter 18. The I/O adapter 18 can connect to peripheral devices, such as disk units 38 and program storage devices 40 that are readable by the system. The system can read the inventive instructions on the program storage devices 40 and follow these instructions to execute the methodology of the embodiments herein. The system further includes a user interface adapter 22 that connects a keyboard 28, mouse 30, speaker 32, microphone 34, and/or other user interface devices such as a touch screen device (not shown) to the bus 14 to gather user input. Additionally, a communication adapter 20 connects the bus 14 to a data processing network 42, and a display adapter 24 connects the bus 14 to a display device 26, which provides a graphical user interface (GUI) 36 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope.

What is claimed is:

1. A processor-implemented method for generating a lip-sync for at least one face to a target speech of a live session to a speech in a plurality of languages with improved visual quality using a machine learning model and a pre-trained lip-sync model, said method comprising: determining a visual representation of the at least one face and an audio representation of the target speech by pre-processing an input file that is obtained from a user device associated with a user, wherein the visual representation of the at least one face comprises a plurality of crops of the at least one face in at least one frame of the input file at a first timestamp and the audio representation of the target speech comprises a spectrum of frequencies of sound at the first timestamp; modifying, using a masking technique, the plurality of crops of the at least one face to obtain a plurality of masked crops of the at least one face, wherein the plurality of masked crops appears black at lower half portions of the plurality of crops; obtaining a reference frame in the visual representation at a second timestamp, wherein the reference frame comprises the plurality of crops of the at least one face at the second timestamp; combining, using a concatenating technique, the plurality of masked crops of the at least one face at a first timestamp with the reference frame at the second timestamp to obtain a plurality of lower half crops of the at least one face at the first timestamp; training the machine learning model by providing a plurality of historical lower half crops associated with a plurality of faces at the first timestamp and a plurality of historical audio representations at the first timestamp as training data to generate a trained machine learning model at the first timestamp; generating, using the trained machine learning model, lip-synced frames at the first timestamp for the at least one face to the target speech of the live session to the speech in the plurality of languages; and generating, by the pre-trained lip-sync model, in-sync lip-synced frames for the at least one face to the target speech of the live session to the speech in the plurality of languages with improved visual quality.

2. The processor-implemented method of claim 1, wherein the optimized lip-synced frames of the target speech are generated using the machine learning model by, providing, to a first discriminator, the lip-synced frames for the at least one face to the target speech and ground truth frames of the lip-synced frames for the at least one face to the target speech, wherein the lip-synced frames for the at least one face to the target speech are generated by a first generator; generating, using the first discriminator, a loss function when there is no difference between the lip-synced frames for the at least one face to the target speech and the ground truth frames of the lip-synced frames for the at least one face to the target speech; backpropagating the loss function to the first generator to optimize the lip-synced frames of the target speech such that the loss function becomes zero; and generating the optimized lip-synced frames of the target speech to obtain the trained machine learning model.

3. The processor-implemented method of claim 2, wherein the first generator comprises an audio encoder, a visual encoder, a concatenator, or a decoder.

4. The processor-implemented method of claim 2, wherein the method comprises correcting a lip-sync error in a broadcast video by locating corresponding face to the target speech.

5. The processor-implemented method of claim 1, wherein the pre-trained lip-sync model is trained by, providing, to a second generator, the lip-synced frames for the at least one face to the target speech to obtain in-sync lip-synced frames for the at least one face to the target speech, wherein out-sync lip-synced frames for the at least one face to the target speech are generated if the lip-synced frames for the at least one face to the target speech are not in-sync; providing, to a second discriminator, the in-sync lip-synced frames for the at least one face to the target speech and a ground truth in-sync lip-synced frames for the at least one face to the target speech; generating, using the second discriminator, a synchronization loss function when there is no difference between the in-sync lip-synced frames for the at least one face to the target speech and ground truth in-sync lip-synced frames for the at least one face to the target speech; backpropagating the synchronization loss function to the second generator to optimize the in-sync lip-synced frames for the at least one face to the target speech such that the synchronization loss function becomes zero; and training the pre-trained lip-sync model by providing an optimized in-sync lip-synced frames for the at least one face to the target speech as training data to the pre-trained lip-sync model.

6. The processor-implemented method of claim 1, the input file is pre-processed by, generating, using a face detector, the plurality of crops of the at least one face that is visible on each frame of the input file from the input file to determine the visual representation of the at least one targeted face, wherein the input file comprises at least one face appearance and an audio of a human voice; and converting the audio of the human voice in the input file the spectrum of frequencies of sound that varies with time or a plurality of features offset to the human voice to determine the audio representation of the target speech.

7. The processor-implemented method of claim 1, wherein the plurality of lower half crops of the at least one face is stored in a database.

8. One or more non-transitory computer-readable storage medium storing the one or more sequence of instructions, which when executed by the one or more processors, causes to perform a method of generating a lip-sync for at least one face to a target speech of a live session to a speech in a plurality of languages in-sync with improved visual quality using a machine learning model and a pre-trained lip-sync model, said method comprising: determining a visual representation of the at least one face and an audio representation of the target speech by pre-processing an input file that is obtained from a user device associated with a user, wherein the visual representation of the at least one face comprises a plurality of crops of the at least one face in at least one frame of the input file at a first timestamp and the audio representation of the target speech comprises a spectrum of frequencies of sound at the first timestamp; modifying, using a masking technique, the plurality of crops of the at least one face to obtain a plurality of masked crops of the at least one face, wherein the plurality of masked crops appears black at lower half portions of the plurality of crops; obtaining a reference frame in the visual representation at a second timestamp, wherein the reference frame comprises the plurality of crops of the at least one face at the second time stamp; combining, using a concatenating technique, the plurality of masked crops of the at least one face at the first timestamp with the reference frame at the second timestamp to obtain a plurality of lower half crops of the at least one face at the first timestamp; training the machine learning model by providing a plurality of historical lower half crops associated with a plurality of faces at the first timestamp and a plurality of historical audio representations at the first timestamp as training data to generate a trained machine learning model at the first timestamp; generating, using the trained machine learning model, lip-synced frames at the first timestamp for the at least one face to the target speech of the live session to the speech in the plurality of languages; and generating, by the pre-trained lip-sync model, in-sync lip-synced frames for the at least one face to the target speech of the live session to the speech in the plurality of languages with improved visual quality.

9. A system for generating a lip-sync for at least one face to a target speech of a live session to a speech in a plurality of languages in-sync with improved visual quality using a machine learning model and a pre-trained lip-sync model, the system comprising: a device processor; and a non-transitory computer-readable storage medium storing one or more sequences of instructions, which when executed by the device processor, causes: determine a visual representation of the at least one face and an audio representation of the target speech by pre-processing an input file that is obtained from a user device associated with a user, wherein the visual representation of the at least one face comprises a plurality of crops of the at least one face in at least one frame of the input file at a first timestamp and the audio representation of the target speech comprises a spectrum of frequencies of sound at the first timestamp; modify, using a masking technique, the plurality of crops of the at least one face to obtain a plurality of masked crops of the at least one face, wherein the plurality of masked crops appears black at lower half portions of the plurality of crops; obtain a reference frame in the visual representation at a second timestamp, wherein the reference frame comprises the plurality of crops of the at least one face at the second time stamp; combine, using a concatenating technique, the plurality of masked crops of the at least one face at the first timestamp with the reference frame at the second timestamp to obtain a plurality of lower half crops of the at least one face at the first timestamp; train the machine learning model by providing a plurality of historical lower half crops associated with a plurality of faces at the first timestamp and a plurality of historical audio representations at the first timestamp as training data to generate a trained machine learning model at the first timestamp; generate, using the trained machine learning model, lip-synced frames at the first timestamp for the at least one face to the target speech of the live session to the speech in the plurality of languages; and generate, by the pre-trained lip-sync model, in-sync lip-synced frames for the at least one face to the target speech of the live session to the speech in the plurality of languages with improved visual quality.

10. The system of claim 9, wherein the optimized lip-synced frames of the target speech are generated using the machine learning model by, providing, to a first discriminator, the lip-synced frames for the at least one face to the target speech and ground truth frames of the lip-synced frames for the at least one face to the target speech, wherein the lip-synced frames for the at least one face to the target speech are generated by a first generator; generating, using the first discriminator, a loss function when there is no difference between the lip-synced frames for the at least one face to the target speech and the ground truth frames of the lip-synced frames for the at least one face to the target speech; backpropagating the loss function to the first generator to optimize the lip-synced frames of the target speech such that the loss function becomes zero; and generating the optimized lip-synced frames of the target speech to obtain the trained machine learning model.

11. The system of claim 10, the input file is pre-processed by, generating, using a face detector, the plurality of crops of the at least one face that is visible on each frame of the input file from the input file to determine the visual representation of the at least one targeted face, wherein the input file comprises at least one face appearance and an audio of a human voice; and converting the audio of the human voice in the input file the spectrum of frequencies of sound that varies with time or a plurality of features offset to the human voice to determine the audio representation of the target speech.

12. The system of claim 10, wherein the first generator comprises an audio encoder, a visual encoder, a concatenator, or a decoder.

13. The system of claim 9, wherein the pre-trained lip-sync model is trained by, providing, to a second generator, the lip-synced frames for the at least one face to the target speech to obtain in-sync lip-synced frames for the at least one face to the target speech, wherein out-sync lip-synced frames for the at least one face to the target speech are generated if the lip-synced frames for the at least one face to the target speech are not in-sync; providing, to a second discriminator, the in-sync lip-synced frames for the at least one face to the target speech and a ground truth in-sync lip-synced frames for the at least one face to the target speech; generating, using the second discriminator, a synchronization loss function when there is no difference between the in-sync lip-synced frames for the at least one face to the target speech and ground truth in-sync lip-synced frames for the at least one face to the target speech; backpropagating the synchronization loss function to the second generator to optimize the in-sync lip-synced frames for the at least one face to the target speech such that the synchronization loss function becomes zero; and training the pre-trained lip-sync model by providing an optimized in-sync lip-synced frames for the at least one face to the target speech as training data to the pre-trained lip-sync model.

14. The system of claim 9, wherein the processor is configured to comprise correcting a lip-sync error in a broadcast video by locating corresponding face to the target speech.

15. The system of claim 9, wherein the plurality of lower half crops of the at least one face is stored in a database.

* * * * *